(12) United States Patent    (10) Patent No.: US 7,076,857 B2
Yang                         (45) Date of Patent: Jul. 18, 2006

(54) METHOD FOR MAKING FOAMED PRODUCTS

(76) Inventor: Chi-Hsiung Yang, No. 35, Sec. 1, Hui-Lai Rd., Hsi-Tun Dist., Taichung City (TW)

( * ) Notice: Subject to any disclaimer, the term of this patent is extended or adjusted under 35 U.S.C. 154(b) by 135 days.

(21) Appl. No.: 10/925,297

(22) Filed: Aug. 24, 2004

(65) Prior Publication Data

US 2006/0043642 A1    Mar. 2, 2006

(51) Int. Cl.
  B29C 44/06  (2006.01)
  B29C 44/08  (2006.01)
  B29C 44/16  (2006.01)

(52) U.S. Cl. ............ 29/527.3; 29/527.1; 264/41; 264/157; 264/154; 12/33.2; 12/146 B

(58) Field of Classification Search ........ 29/527.1, 29/527.3; 264/41, 157, 154; 36/43, 44; 12/33.2, 146 B
See application file for complete search history.

(56) References Cited

U.S. PATENT DOCUMENTS 5,972,257 A * 10/1999 Liu ................ 264/40.4
6,299,806 B1 * 10/2001 Chen et al. ........ 264/45.1

* cited by examiner

Primary Examiner—George Nguyen
Assistant Examiner—Christopher Agrawal
(74) Attorney, Agent, or Firm—Frommer Lawrence & Haug LLP; Ronald R. Santucci

(57) ABSTRACT

A method for making foamed products includes the steps of: (a) foaming a foamable blank at an elevated temperature; (b) forming a plurality of blind holes in the blank which has been foamed, by using a mold having a plurality of protrusions, the protrusions pressing the blank to form the blind holes and to create densified depths respectively in the blind holes; (c) cross-cutting the blank along a plane which extends across the blind holes so that the blank is divided into a first foam sheet having a plurality of through holes and a second foam sheet having a plurality of blind bores with the densified depths; and (d) heating the second foam sheet to expand and to form the densified depths into projections protruding from the second foam sheet.

6 Claims, 19 Drawing Sheets

METHOD FOR MAKING FOAMED PRODUCTS

BACKGROUND OF THE INVENTION

1. Field of the Invention

The invention relates to a method for making foamed products, more particularly to a method for making foamed products having different configurations.

2. Description of the Related Art

Referring to FIGS. 1, 2, and 3, a conventional method for making foamed products includes the steps of:

(1) forming a foamed blank 10 by foaming a foamable blank at an elevated temperature, the foamed blank 10 having a top surface 101 and a bottom surface 102;

(2) forming a plurality of first blind holes 12 in the top surface 101 and a plurality of second blind holes 13 in the bottom surface 102 by using a mold 20, the mold 20 including an upper mold part 21 provided with a plurality of first protrusions 211, and a lower mold part 22 provided with a plurality of second protrusions 221, the first and second protrusions 211,221 pressing the top and bottom surfaces 101,102 of the foamed blank 10 to form a molded foamed blank 11 having the first and second blind holes 12,13 in the top and bottom surfaces 101,102, respectively; and (3) cross-cutting the molded foamed blank 11 along two planes (I,II) so that the molded foamed blank 11 is divided into two first foam sheets 14 having a plurality of through holes 120, and a second foam sheet 15 having no holes.

Although the aforesaid conventional method can be used to fabricate the foam sheet 14 having a plurality of through holes 120, which can be further processed to form an insole (not shown), it has the following shortcomings:

1. The second foam sheet 15 formed from the aforesaid conventional method is devoid of any practical value and is usually discarded.

2. In view of the aforesaid shortcoming, the useful foam sheet 14 made by the conventional method is restricted to a single configuration.

3. Since the upper and lower mold parts 21,22 are separated from each other while the molded foamed blank 11 is still warm, it is difficult to ensure that the molded foamed blank 11 has the first and second blind holes 12,13 with identical configurations, respectively, due to different foaming rates at different sites of the molded foamed blank 11.

4. In view of the same reason as described in the third shortcoming, the first and second blind holes 12,13 of the molded foamed blank 11 are liable to break, especially when the first and second blind holes 12,13 are relatively deep. Therefore, the yield of the conventional method is not satisfactory.

SUMMARY OF THE INVENTION

Therefore, the object of the present invention is to provide a method for making foamed products, which will provide the foamed products with different configurations, which is relatively efficient in terms of blank usage, and which enhances the quality of the foamed products.

In the first aspect of this invention, the method for making foamed products according to this invention includes the steps of: (a) foaming a foamable blank at an elevated temperature; (b) forming a plurality of blind holes in the blank which has been foamed, by using a mold having a plurality of protrusions, the protrusions pressing the blank to form the blind holes and to create densified depths respectively in the blind holes; (c) cross-cutting the blank along a plane which extends across the blind holes so that the blank is divided into a first foam sheet having a plurality of through holes and a second foam sheet having a plurality of blind bores with the densified depths; and (d) heating the second foam sheet to expand and to form the densified depths into projections protruding from the second foam sheet.

In the second aspect of this invention, the method for making foamed products according to this invention includes the steps of: (a) providing a foamable laminated blank having a first layer and a second layer; (b) foaming the foamable laminated blank at an elevated temperature; (c) forming a plurality of blind holes in the blank which has been foamed, by using a mold having a plurality of protrusions, the protrusions pressing the first and second layers to form the blind holes and to create densified depths respectively in the blind holes; (d) cross-cutting the blank which has been foamed, along a plane which extends across the blind holes so that the blank is divided into a first foam sheet having a plurality of through holes and a second foam sheet having a plurality of blind bores with the densified depths; and (e) heating the second foam sheet to expand and to form the densified depths into projections protruding from the second foam sheet, the projections including both of the first and second layers.

In the third aspect of this invention, the method for making foamed products according to this invention includes the steps of: (a) foaming a foamable blank at an elevated temperature, the blank having first and second surfaces; (b) forming a plurality of first blind holes in the first surface and a plurality of second blind holes in the second surface by using a mold having a plurality of protrusions after the blank has been foamed, the protrusions pressing the first and second surfaces of the blank to form the first and second blind holes and to create densified depths respectively in the first and second blind holes; (c) cross-cutting the blank which has been foamed, along two planes one of which extends across the first blind holes and the other of which extends across the second blind holes so that the blank is divided into two first foam sheets, each of which has a plurality of through holes, and a second foam sheet having two opposite surfaces, each of which includes a plurality of blind bores with said densified depths; and (d) heating the second foam sheet to expand and to form the densified depths into projections protruding from the opposite surfaces of the second foam sheet.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
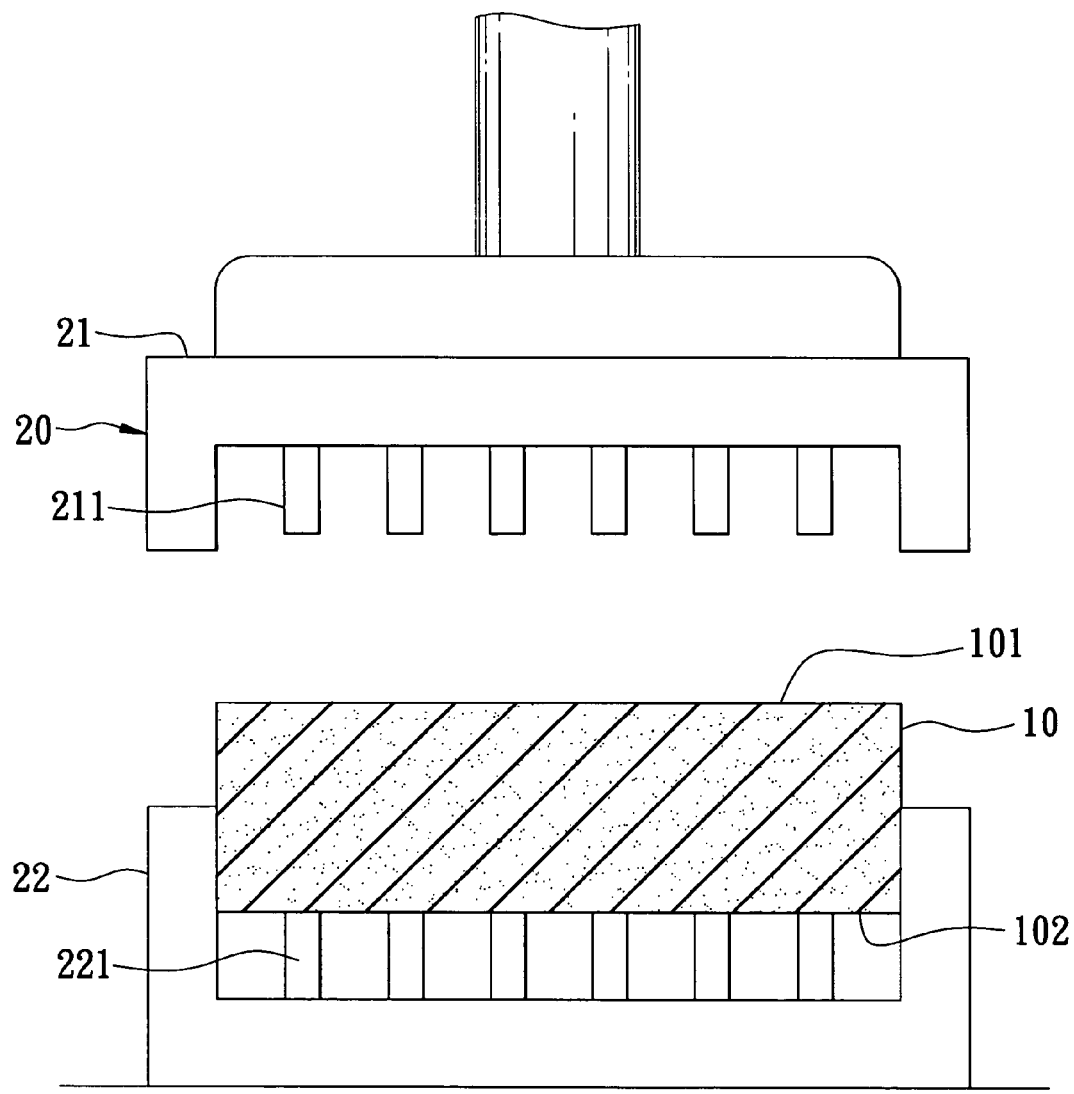
FIGS. 1, 2, 3 are schematic sectional views showing consecutive steps of a conventional method for making foamed products.
Figure 2:
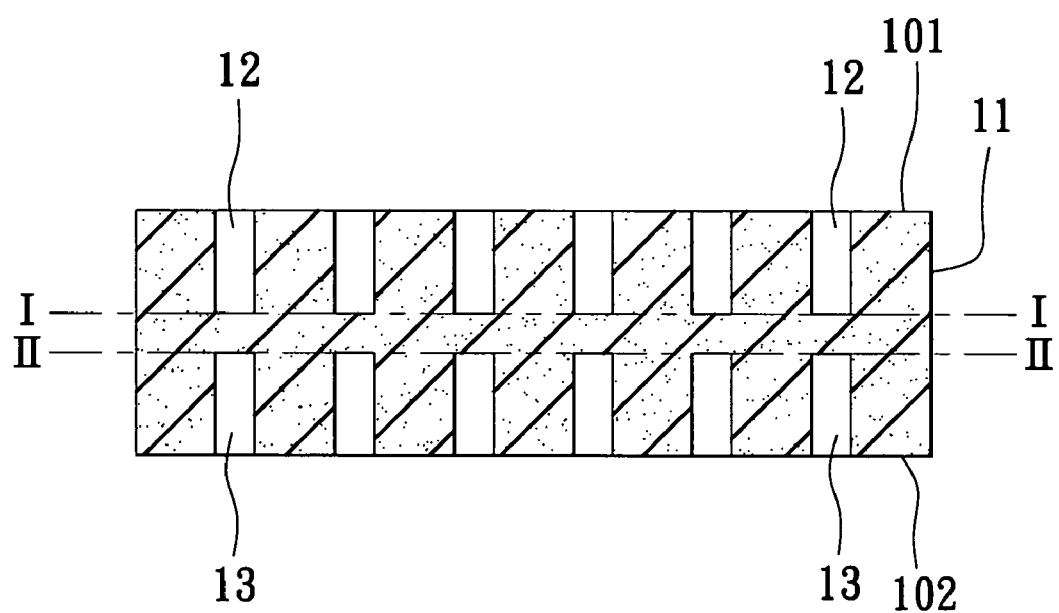
Figure 3:
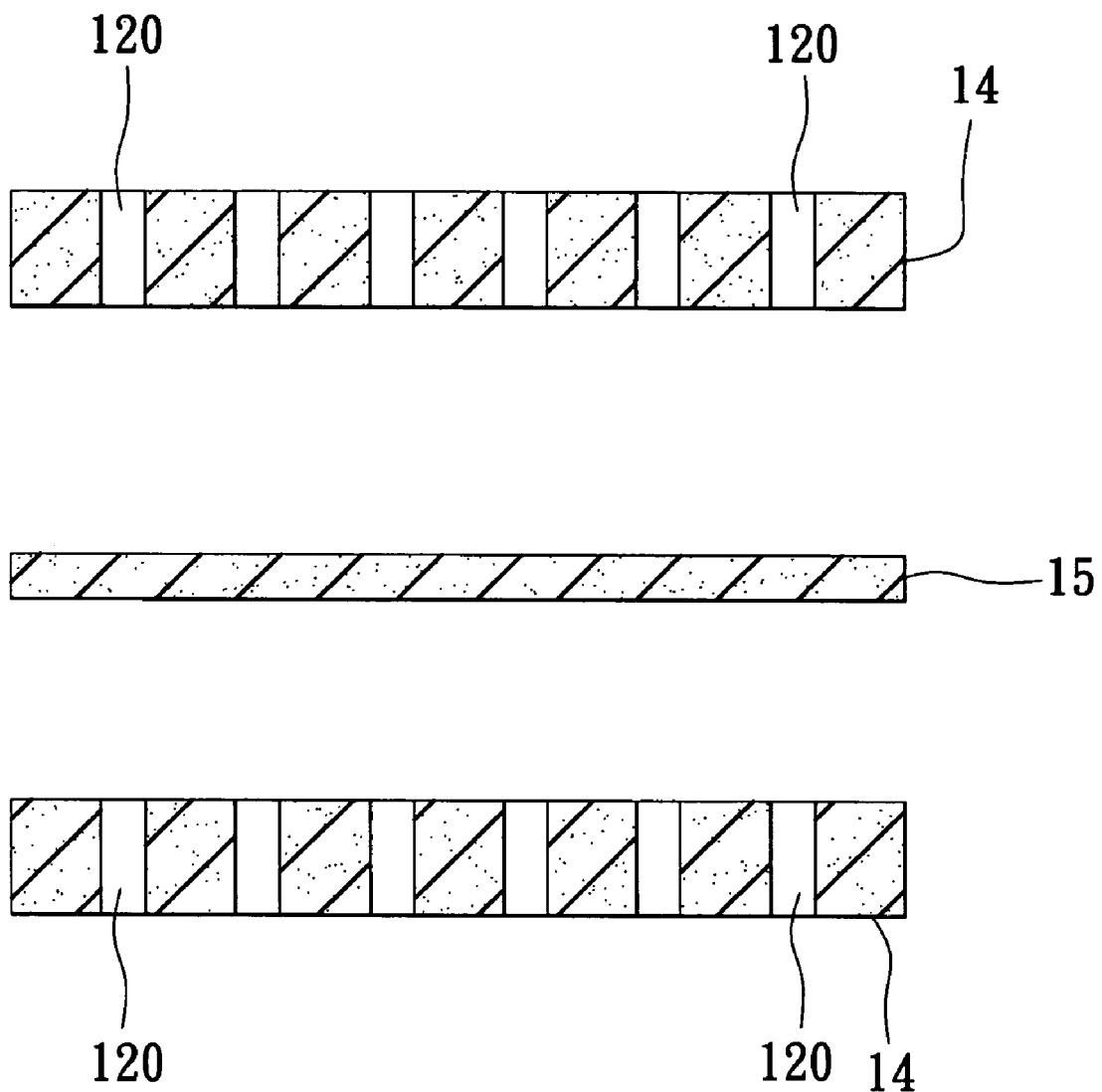
Figure 4:
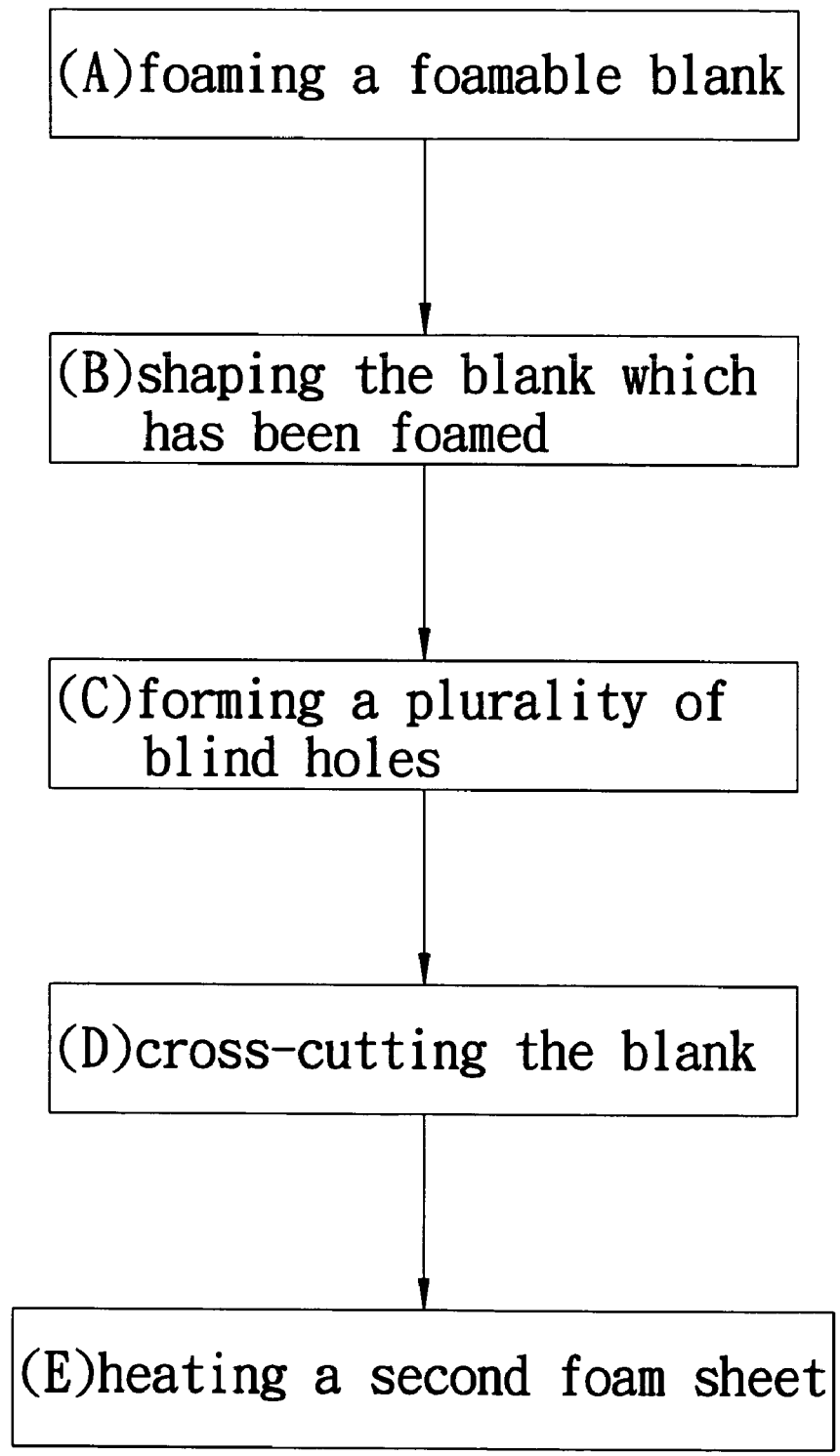
FIG. 4 is a flow diagram of the first preferred embodiment of a method for making foamed products according to this invention.
Figure 5:
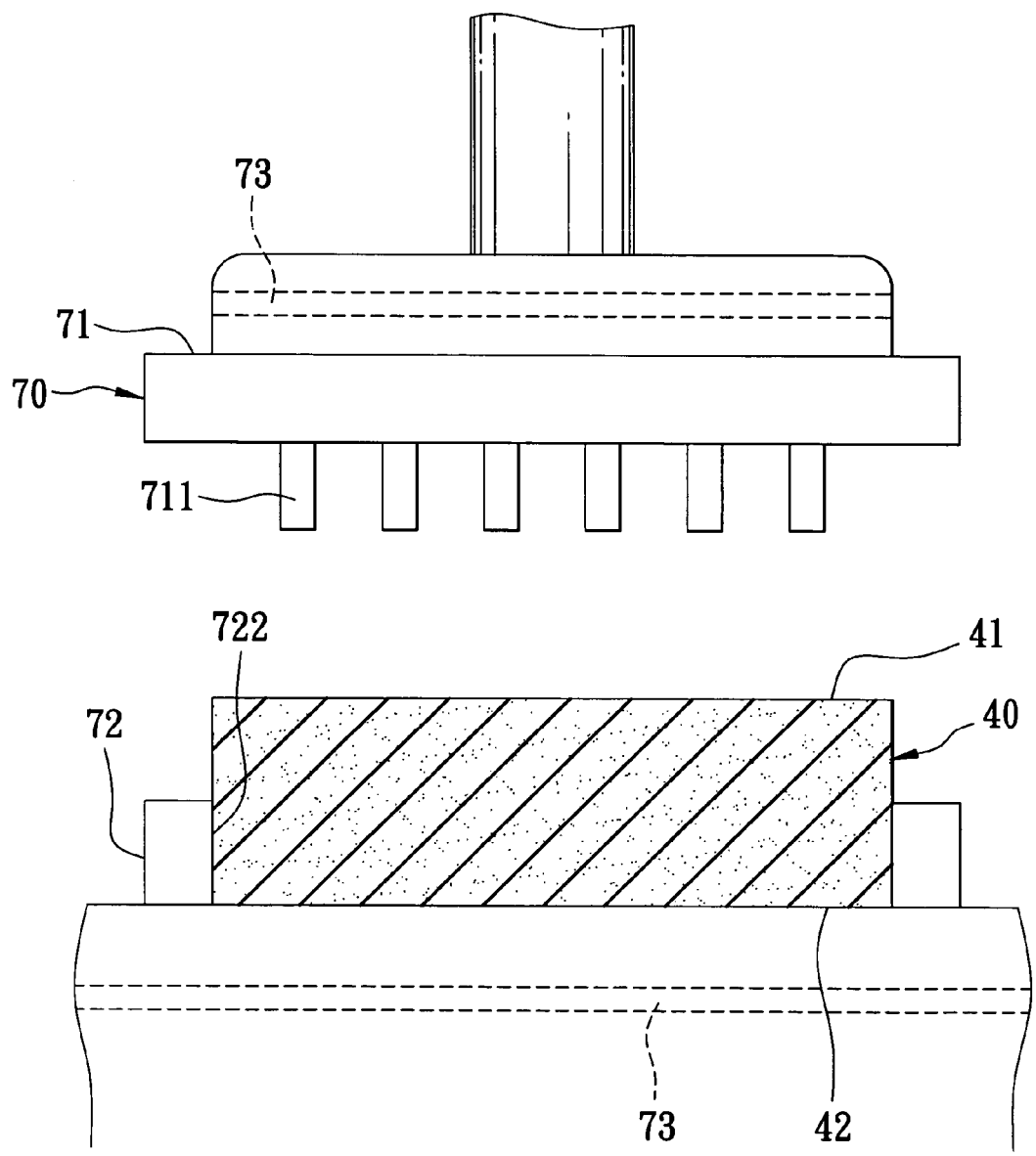
FIGS. 5, 6, 7, and 8 are schematic sectional views showing consecutive steps of the first preferred embodiment.

Referring to FIGS. 4, 5, 6, 7, 8, 9, and 10, the first preferred embodiment of the method for making foamed products according to this invention includes the steps of:

A) foaming a foamable blank:

A foamable blank is foamed by adding sulfur at an elevated temperature, preferably at a temperature up to about 180° C. The foamable blank useful in this invention is a thermoplastic material, such as, polyethylene, polyurethane, ethylene-vinyl acetate copolymer, polyvinyl chloride, thermoplastic rubber, rubber foam, and the like. Polyethylene is used in the preferred embodiment. The blank 40, which has been foamed, has a first surface 41 and a second surface 42 opposite to each other.

B) optionally, shaping the blank 40:

The blank 40 is cut to a desired shape (such as, the shape of an insole) after being cooled, and is then re-softened by heating in an oven (not shown).

C) forming a plurality of blind holes 43:

The blank 40, which has been foamed, is formed with a plurality of blind holes 43 by using a mold 70 having a plurality of protrusions 711. The mold 70 includes a lower mold part 72 having a cavity 722 to receive the blank 40 which has been foamed, and an upper mold part 71 having the protrusions 711. The cross-sectional shape of the protrusions 711 can be designed to meet desired requirements. The blank 40 has a thickness larger than a depth of the cavity 722. The protrusions 711 press the blank 40 to form the blind holes 43 in the first surface 41 and to create densified depths 44 respectively in the blind holes 43. The mold 40 is cooled by a cooling system 73 mounted on each of the upper and lower mold parts 71,72 while the protrusions 711 of the mold 70 press the blank 40.

D) cross-cutting the blank 40:

The blank 40 is cross-cut along a plane 80 which extends across the blind holes 43 so that the blank 40 is divided into a first foam sheet 50 having a plurality of through holes 430 and a second foam sheet 60 having a plurality of blind bores 430' with the densified depths 44.

E) heating the second foam sheet 60:

The second foam sheet 60 is heated in an oven (not shown) to expand and to form the densified depths 44 into projections 440 protruding from the second foam sheet 60.

Figure 11:
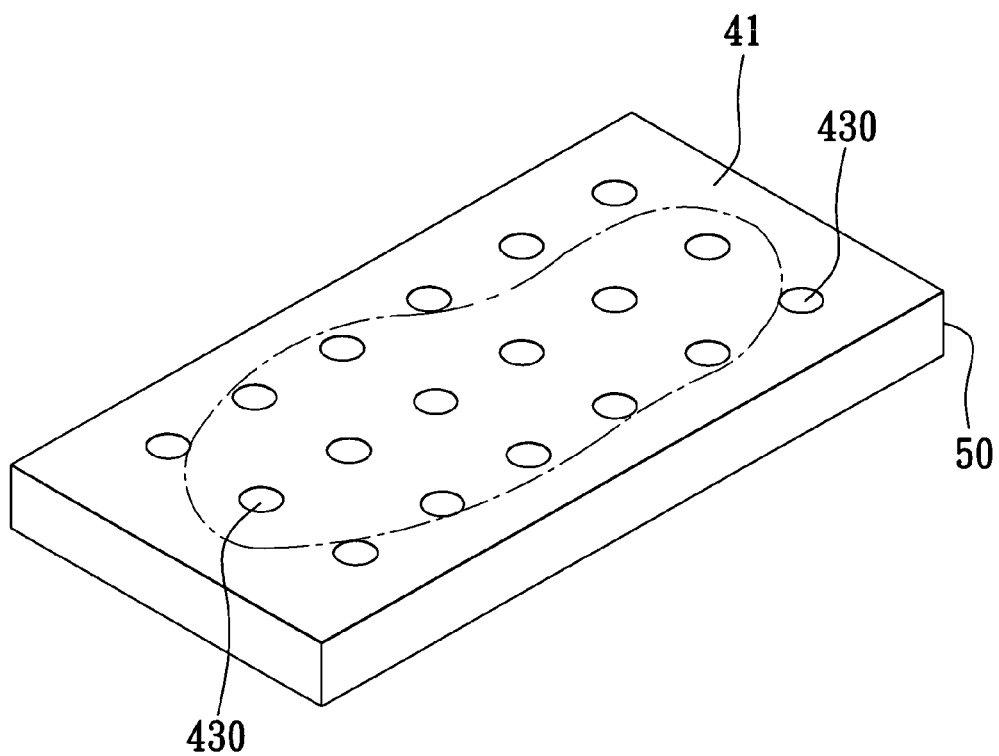
FIG. 11 is a perspective view showing a foam sheet made by the first preferred embodiment.
Figure 12:
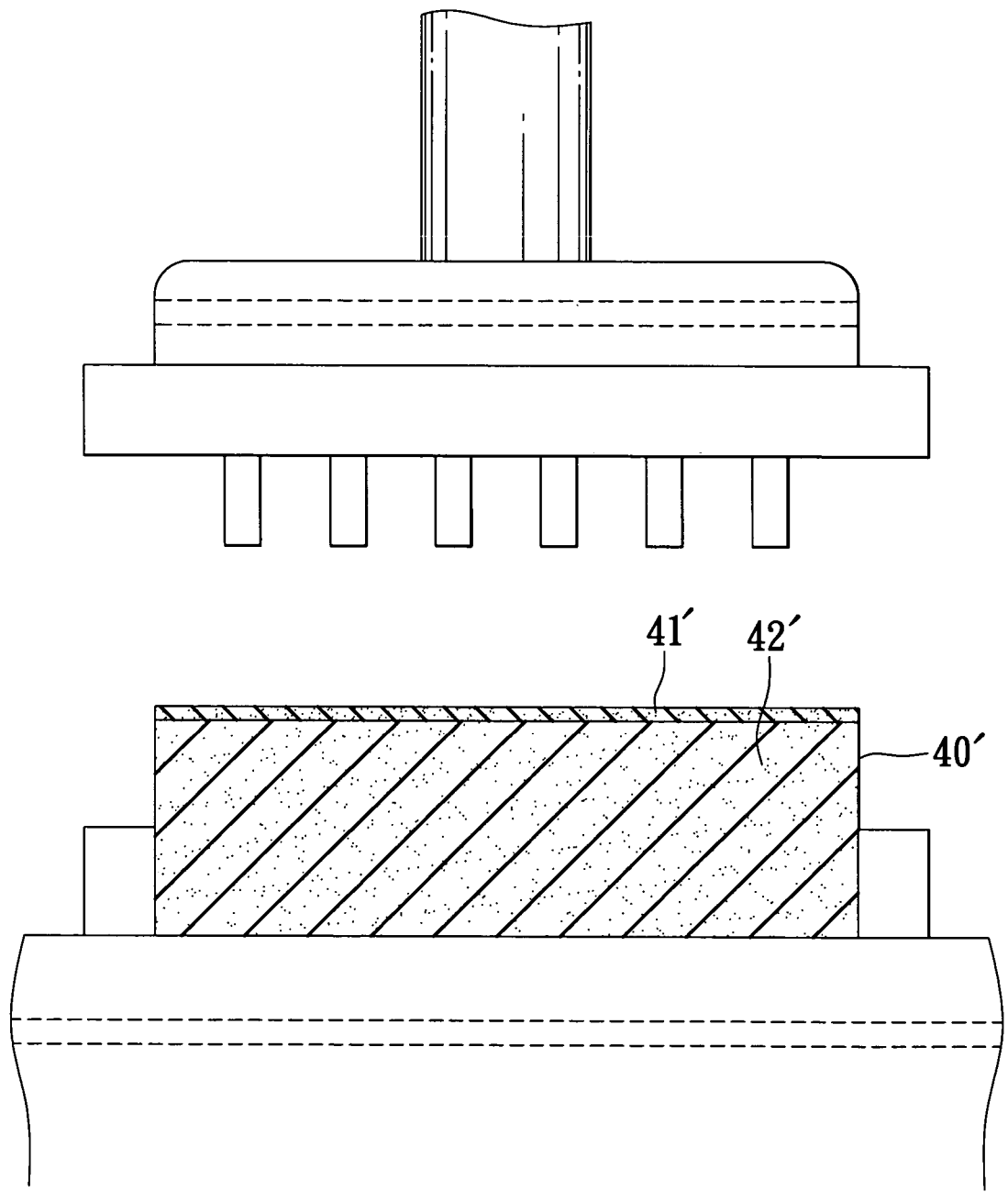
FIGS. 12, 13, 14, and 15 are schematic sectional views showing consecutive steps of the second preferred embodiment of a method for making foamed products according to this invention.
Figure 13:
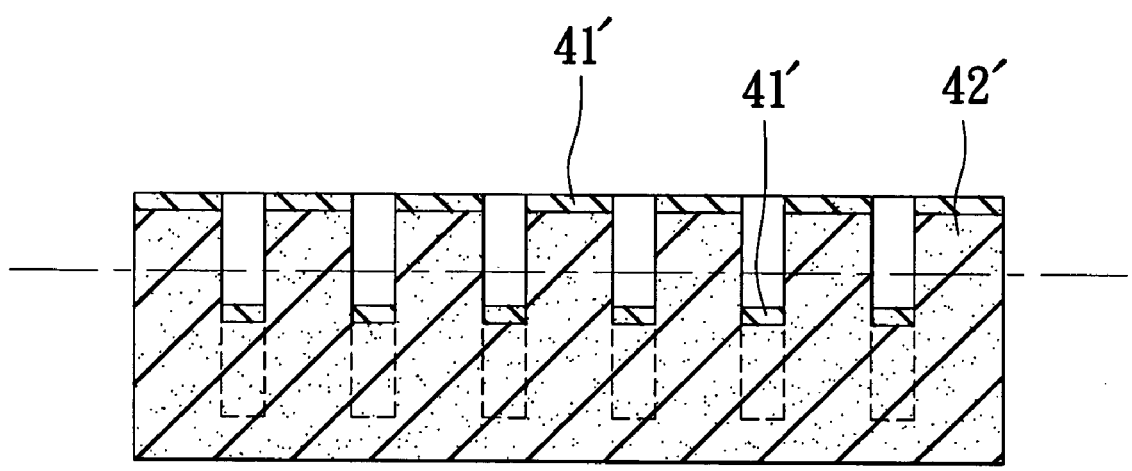
Figure 14:
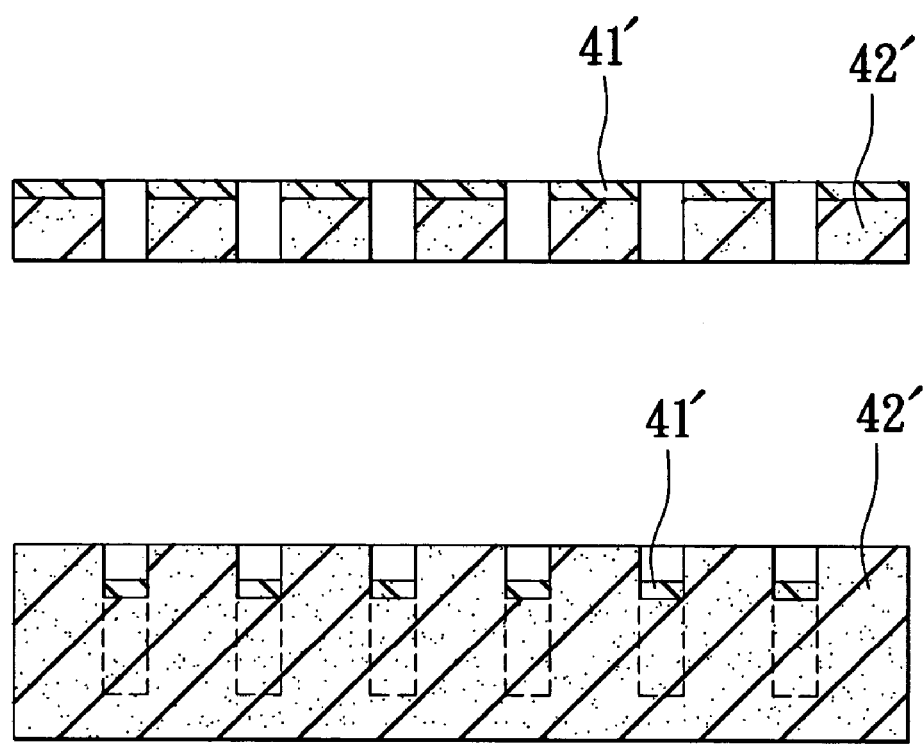

In view of the aforesaid, the first and second foam sheets 50,60 having different configurations can be fabricated in the method according to this invention. Referring to FIG. 11, the first foam sheet 50 can be further processed to produce an insole having a ventilation effect. The second foam sheet 60 can be used as an insole having a massage effect, an acoustic pad, an anti-slip pad, and the like.

Figure 15:
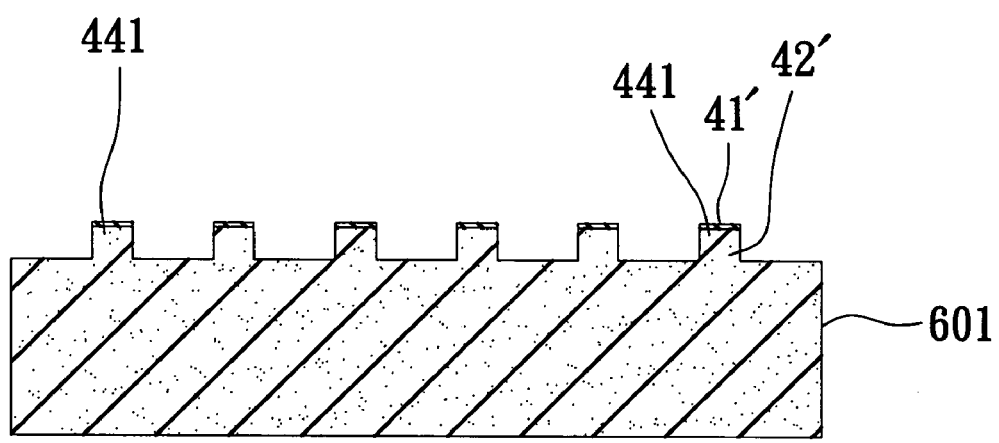
Figure 16:
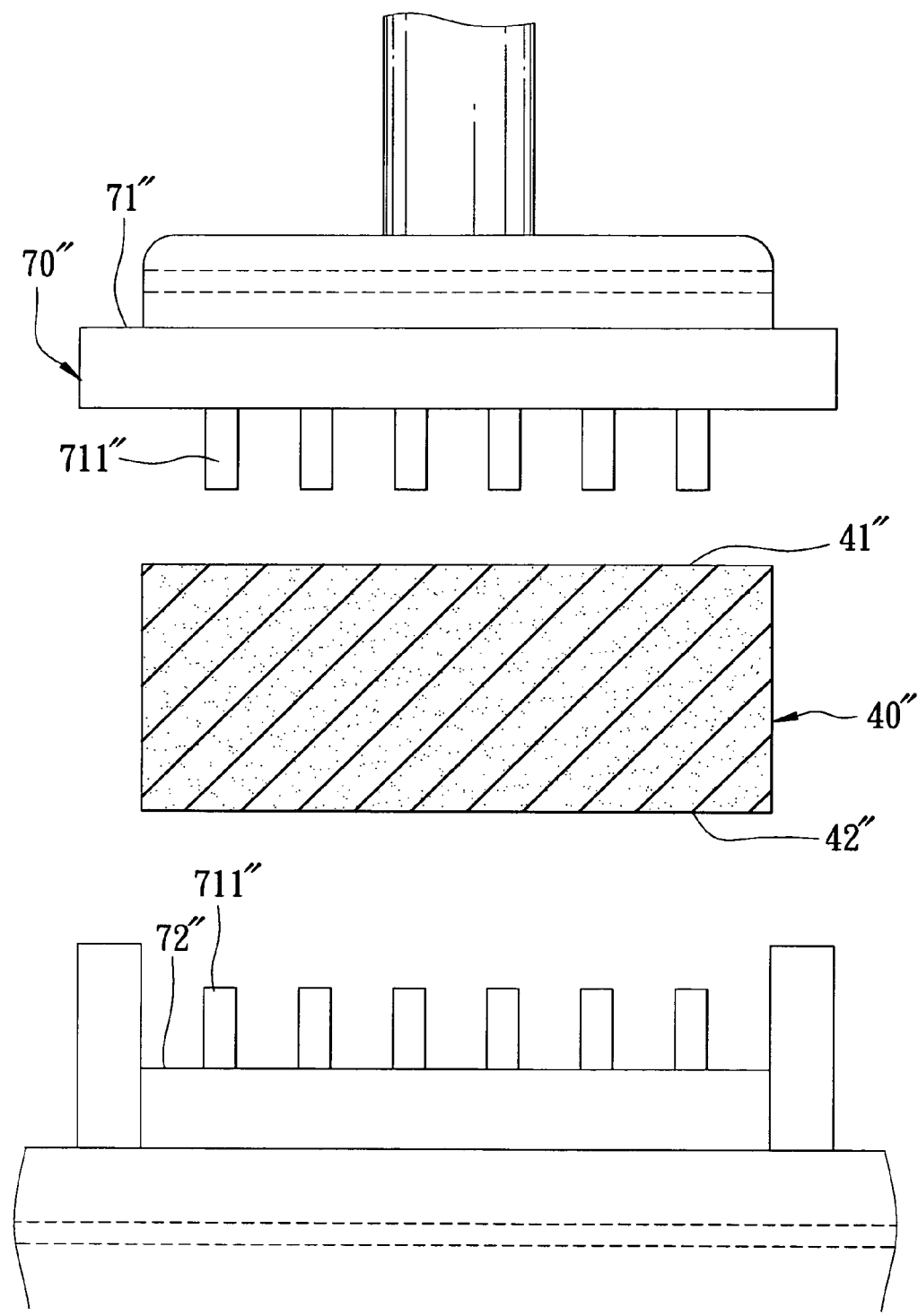
FIGS. 16, 17, 18, and 19 are schematic sectional views showing consecutive steps of the third preferred embodiment of a method for making foamed products according to this invention.
Figure 17:
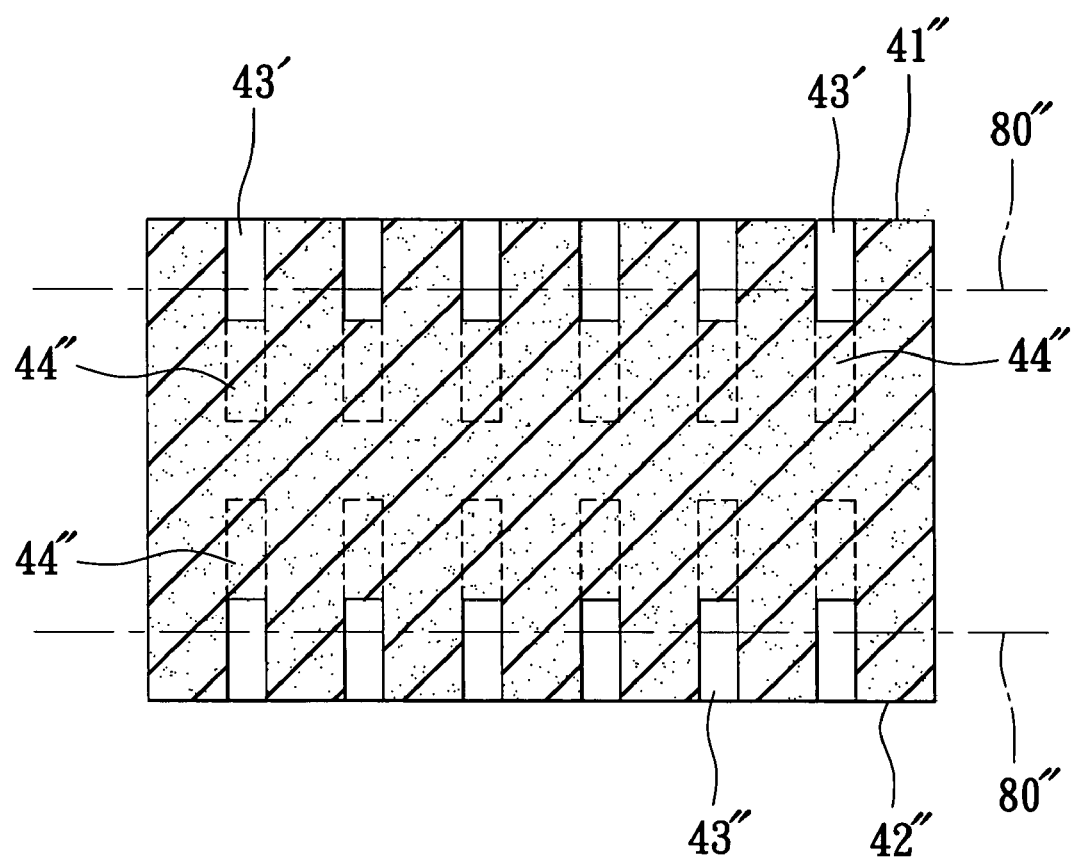
Figure 18:
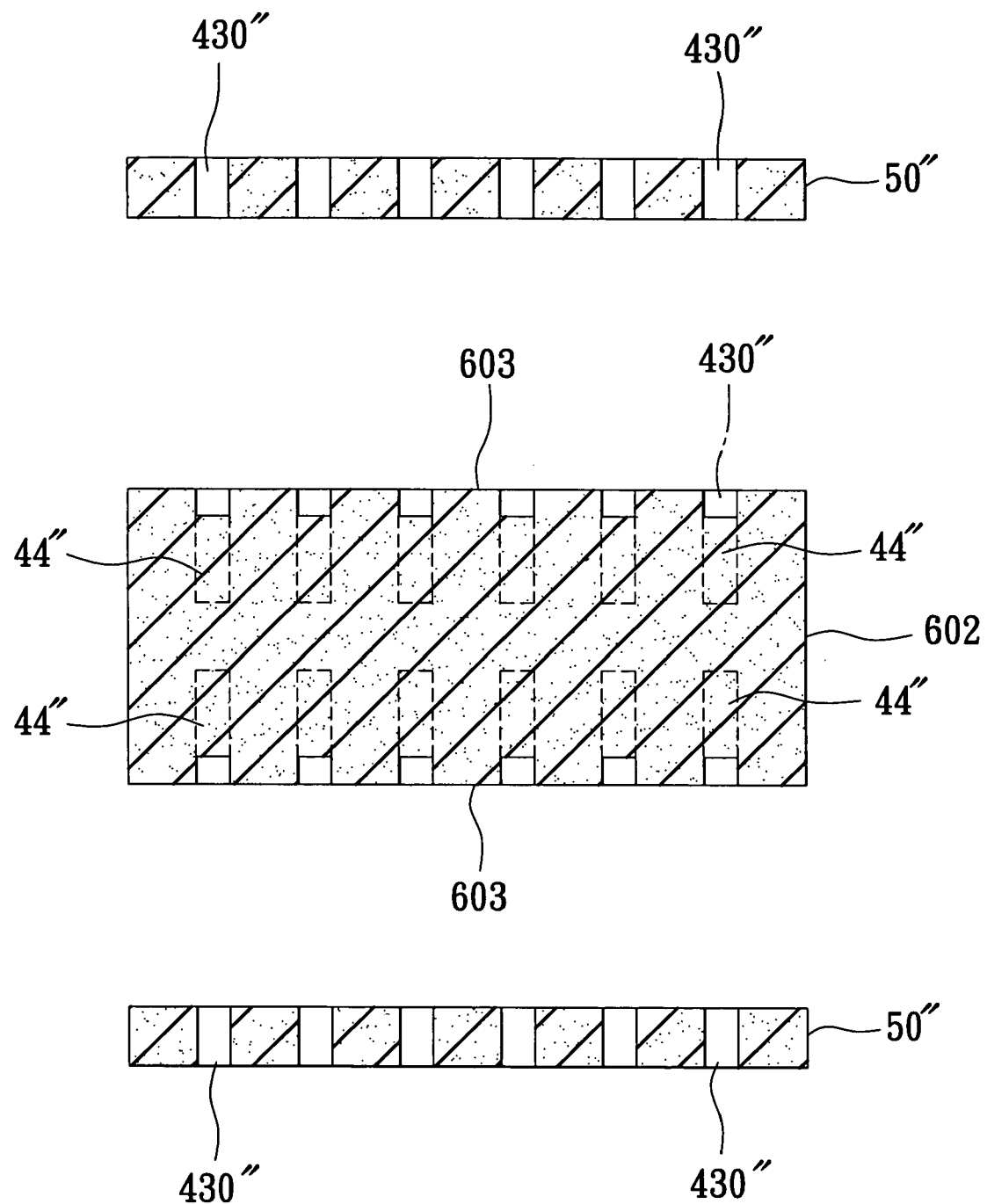
Figure 19:
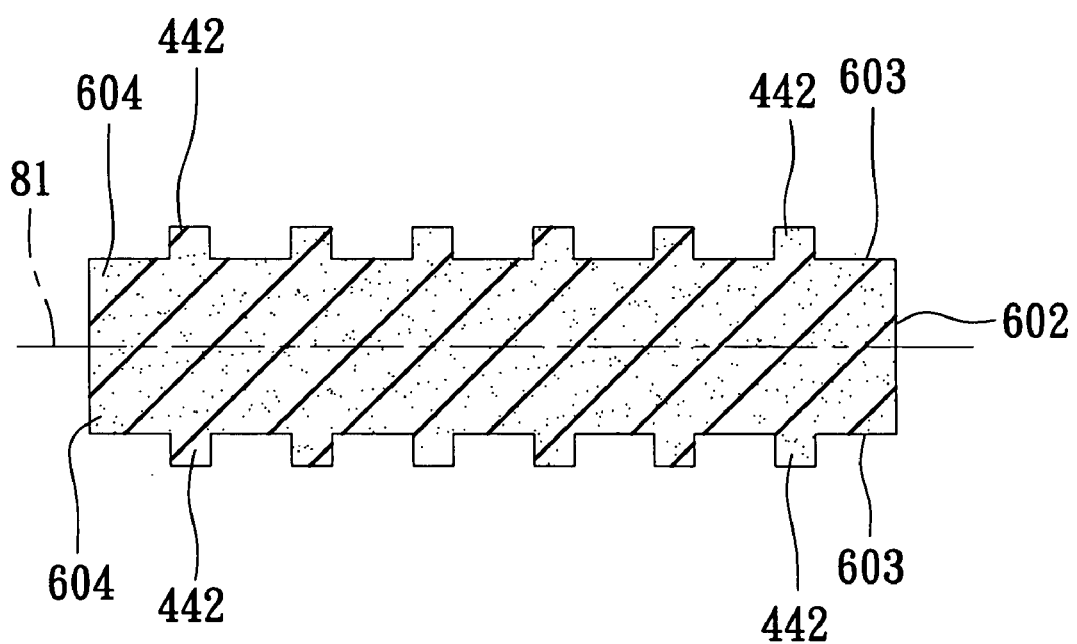

Referring to FIGS. 12, 13, 14, and 15, the second preferred embodiment of the method according to this invention is shown to be similar to the first preferred embodiment, except that a foamable laminated blank 40', which has a first layer 41' and a second layer 42', is used in the second preferred embodiment. The first and second layers 41', 42' have different colors. As shown in FIG. 15, the second foam sheet 601 made by the second preferred embodiment is formed with a plurality of projections 441 including both of the first and second layers 41',42'.

Referring to FIGS. 16, 17, 18, and 19, the third preferred embodiment of the method according to this invention is similar to the first preferred embodiment, except that the mold 70" used in the third preferred embodiment has a plurality of the protrusions 711" at each of the upper and lower mold parts 71",72" to press against the opposite first and second surfaces 41",42" of the foamed blank 40", thereby forming a plurality of first blind holes 43' in the first surface 41" and a plurality of second blind holes 43" in the second surface 42". The protrusions 711" press the first and second surfaces 41",42" of the blank 40" to form the first and second blind holes 43',43" and to create densified depths 44" respectively in the first and second blind holes 43',43". By cross-cutting along two planes 80" one of which extends across the first blind holes 43' and the other of which extends across the second blind holes 43", the third preferred embodiment can be used to make two first foam sheets 50", each of which has a plurality of through holes 430", and a second foam sheet 602 having two opposite surfaces 603, each of which includes a plurality of blind bores 430" with the densified depths 44". The second foam sheet 602 is heated to expand and to form the densified depths 44" into projections 442 protruding from a corresponding one of the opposite surfaces 603 of the second foam sheet 602. If desired, the second foam sheet 602 can be further cross-cut along a plane 81 so that the second foam sheet 602 is divided into two foam sheets 604, each of which includes a plurality of the projections 442.

Figure 6:
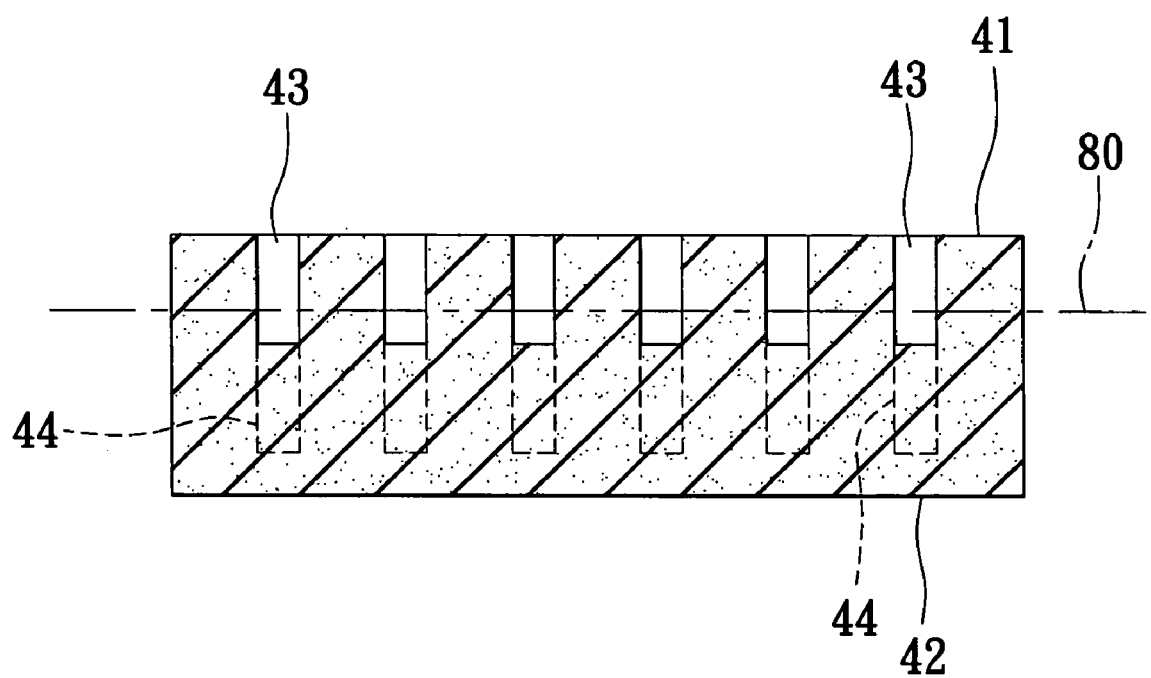
Figure 7:
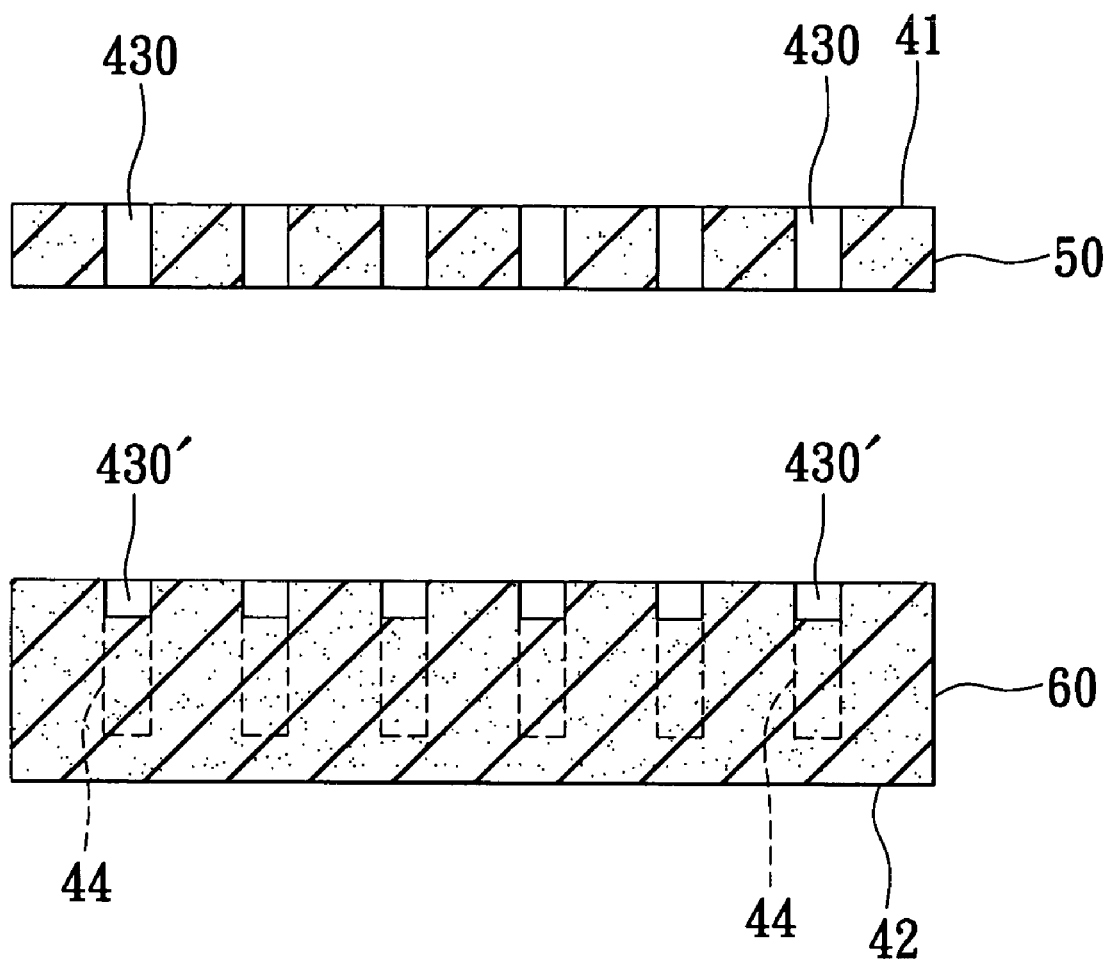
Figure 8:
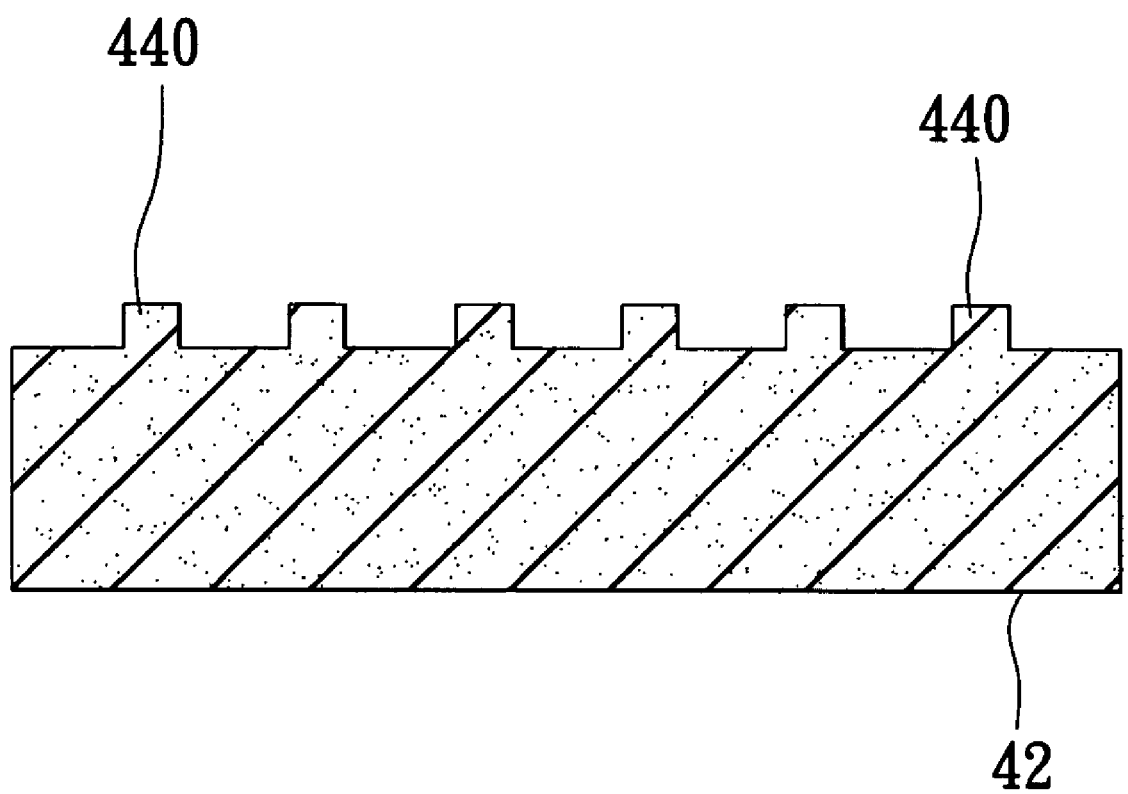
Figure 9:
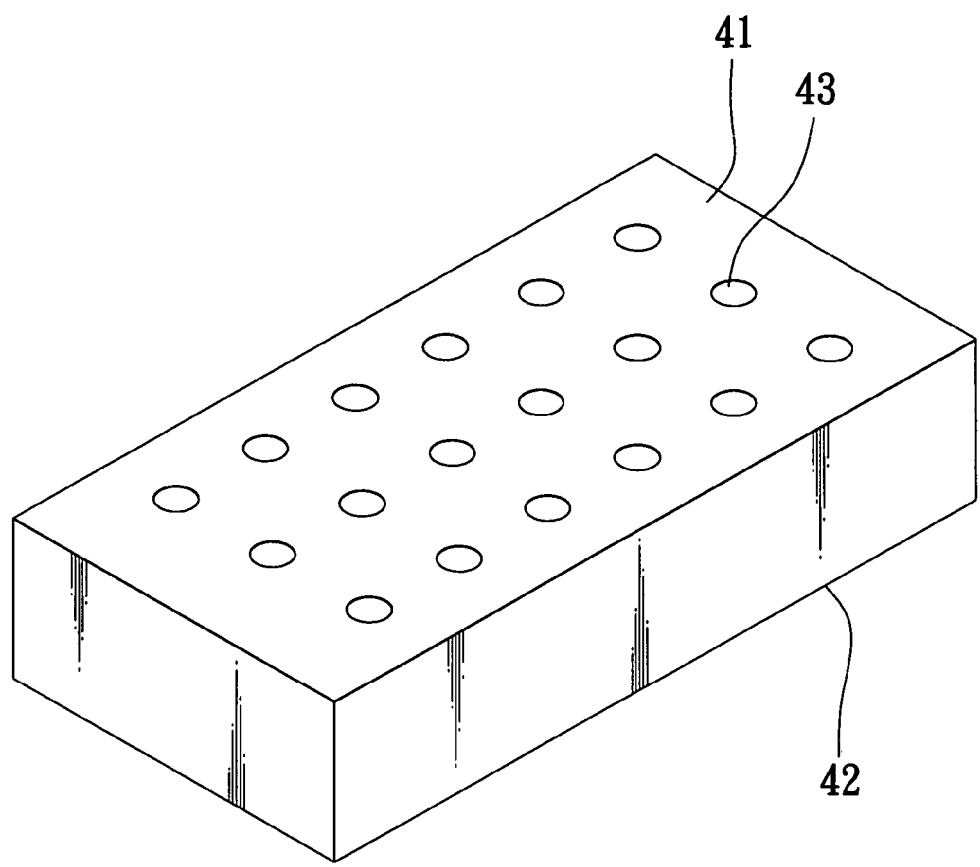
FIG. 9 is a perspective view of FIG. 6.
Figure 10:
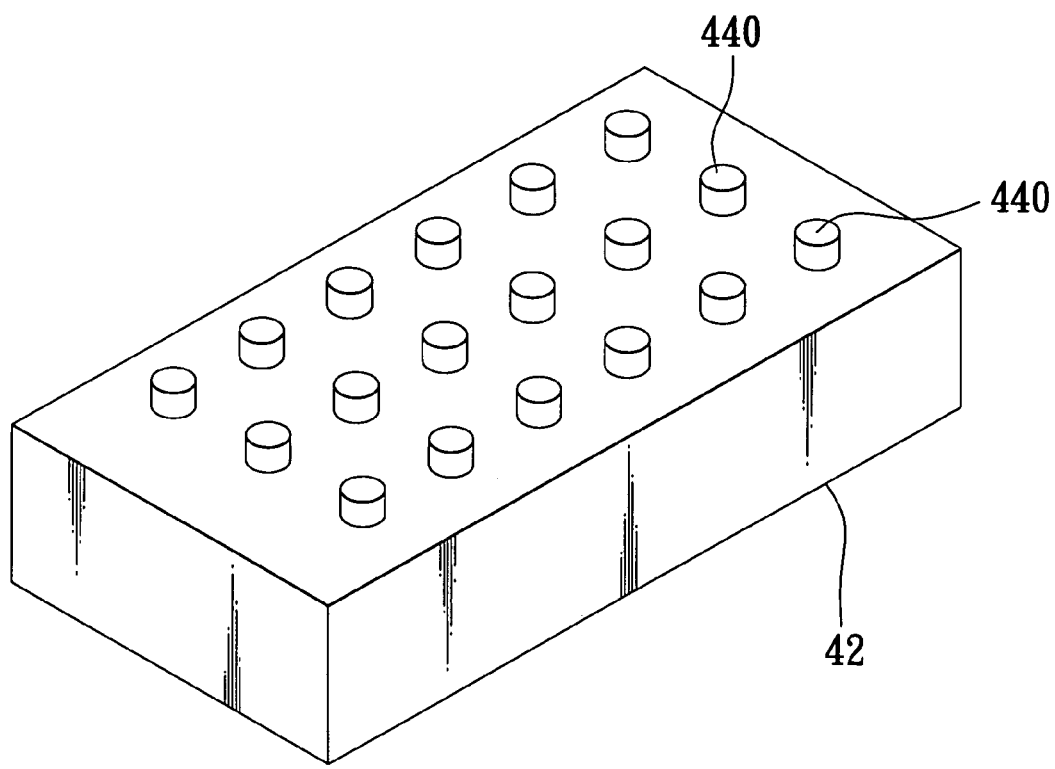
FIG. 10 is a perspective view of FIG. 8.

Referring to FIG. 6, in practice, the blank 40 can be cross-cut along a plurality of the planes 80 parallel to each other so as to obtain a plurality of the first foam sheets 50 (see FIG. 7), each of which has a plurality of through holes 430.

In view of the foregoing, the method of this invention can achieve the following advantages over the prior art:

(1) As compared to the conventional method, the foamed products made by the method according to this invention has various configurations.

(2) The shortcoming of the prior art in respect to waste can be overcome by the method according to this invention.

(3) Since the blank 40,40',40" is pressed by the protrusions 711,711" of the mold 70,70" while the mold 70,70" is cooled by the cooling system 73, the blank 40,40',40" after the pressing step has a relatively stable quality. Therefore, the foamed products obtained therefrom are superior in quality, and a relatively high yield is possible.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for making foamed products, comprising the steps of:

(a) foaming a foamable blank at an elevated temperature;

(b) forming a plurality of blind holes in said blank which has been foamed, by using a mold having a plurality of protrusions, wherein said protrusions press said blank to form said blind holes and to create densified depths respectively in said blind holes;

(c) cross-cutting said blank along a plane which extends across said blind holes so that said blank is divided into a first foam sheet having a plurality of through holes and a second foam sheet having a plurality of blind bores with said densified depths; and (d) heating said second foam sheet to expand and to form said densified depths into projections protruding from said second foam sheet.

2. The method as claimed in claim 1, further comprising a step of cooling said mold while said protrusions of said mold press said blank.

3. The method as claimed in claim 1, wherein said mold includes a lower mold part having a cavity to receive said blank which has been foamed, and an upper mold part having said protrusions, said blank having a thickness larger than a depth of said cavity.

4. A method for making foamed products, comprising the steps of:

(a) providing a foamable laminated blank having a first layer and a second layer;

(b) foaming said foamable laminated blank at an elevated temperature;

(c) forming a plurality of blind holes in said blank which has been foamed, by using a mold having a plurality of protrusions, wherein said protrusions press said first and second layers to form said blind holes and to create densified depths respectively in said blind holes;

(d) cross-cutting said blank which has been foamed, along a plane which extends across said blind holes so that said blank is divided into a first foam sheet having a plurality of through holes and a second foam sheet having a plurality of blind bores with said densified depths; and (e) heating said second foam sheet to expand and to form said densified depths into projections protruding from said second foam sheet, wherein said projections include both of said first and second layers.

5. The method of claim 4, wherein said first and second layers have different colors.

6. A method for making foamed products, comprising the steps of:

(a) foaming a foamable blank at an elevated temperature, said blank having first and second surfaces;

(b) forming a plurality of first blind holes in said first surface and a plurality of second blind holes in said second surface by using a mold having a plurality of protrusions after said blank has been foamed, wherein said protrusions press said first and second surfaces of said blank to form said first and second blind holes and to create densified depths respectively in said first and second blind holes;

(c) cross-cutting said blank which has been foamed, along two planes one of which extends across said first blind holes and the other of which extends across said second blind holes so that said blank is divided into two first foam sheets each having a plurality of through holes, and a second foam sheet having two opposite surfaces, each of which includes a plurality of blind bores with said densified depths; and (d) heating said second foam sheet to expand and to form said densified depths into projections protruding from said opposite surfaces of said second foam sheet.

* * * * *